United States Patent [19]

Huisman

[11] Patent Number: 4,467,382
[45] Date of Patent: Aug. 21, 1984

[54] MAGNETIC RECORDING AND PLAYBACK DEVICE HAVING MEANS FOR REDUCING HEAD CORROSION

[75] Inventor: Hendrikus F. Huisman, Oosterhout, Netherlands

[73] Assignee: U.S. Philips Corporation, New York, N.Y.

[21] Appl. No.: 322,499

[22] Filed: Nov. 18, 1981

[30] Foreign Application Priority Data

Dec. 2, 1980 [NL] Netherlands ......................... 8006544

[51] Int. Cl.$^3$ ............................................... G11B 5/12
[52] U.S. Cl. .................................... 360/125; 360/122; 360/128; 360/137
[58] Field of Search ............... 360/125, 122, 128–129, 360/137; 204/147, 196, DIG. 5

[56] References Cited

U.S. PATENT DOCUMENTS

| | | | |
|---|---|---|---|
| 3,536,857 | 10/1970 | Kohl | 360/125 X |
| 4,226,694 | 10/1980 | Baboian et al. | 204/196 |
| 4,311,576 | 1/1982 | Touda et al. | 204/196 |

*Primary Examiner*—John H. Wolff
*Attorney, Agent, or Firm*—Joseph P. Abate

[57] ABSTRACT

A magnetic recording and playback device includes a magnetic head of a metallic soft magnetic material which, during operation, is in mechanical contact with a magnetic tape moved passed the head. In order to prevent corrosive detrition of the contact face of the magnetic head under the influence of moisture from the tape, the magnetic head has a negative voltage with respect to ground.

9 Claims, 3 Drawing Figures

MAGNETIC RECORDING AND PLAYBACK DEVICE HAVING MEANS FOR REDUCING HEAD CORROSION

BACKGROUND OF THE INVENTION

The invention relates to a magnetic recording and playback device which includes a magnetic head of the type having a tape contact face, and more particularly to such a device including means for guiding, during operation, a magnetic tape along the tape contact face of the magnetic head. The tape is of the type in which a lacquer layer, in which a magnetic pigment is dispersed, is provided on a synthetic carrier. The magnetic head comprises a magnetic core of a metallic material which defines a transducing gap.

It is a known phenomenon that the magnetic heads which are used in magnetic recording and playback devices, for example, tape and cassette recorders, are subject to detrition. Heretofore, it has been assumed that abrasive behavior of the magnetic tape was the main cause of the head detrition and attempts have been made to develop new head materials which are harder and, hence, better able to withstand abrasive detrition. An example of such a new material in Sendust. Unfortunately, however, it has been found that the problem of detrition of the head was not solved by the introduction of harder materials.

From investigations which led to the present invention, it was found that undesired head-tape interactions, particularly, detrition of heads having a magnetic core of a metallic material, are governed to a considerable extent by complex physicalchemical corrosion-like processes. It has been found that various water-soluble chemicals can emanate from the tape. These chemicals may originate from impurities of the oxidic magnetic pigment, from the dispersing agents used, from the binder etc. and in nearly all cases they are of an acidic nature. These chemicals are emitted from the tape under the influence of moisture which is absorbed by the tape to an extent dependent upon the relative humidity and the structure of the lacquer layer. This creates an ideal situation for corrosion of the tape contacting surface of a magnetic head core.

SUMMARY OF THE INVENTION

It is the object of the present invention to provide a magnetic recording and playback device of the kind mentioned in the opening paragraph but having an improved resistance against corrosive wear of the magnetic head.

According to the invention this object is achieved in that, during operation, the magnetic head core has a negative direct voltage with respect to ground.

PRIOR ART

In magnetic recording and playback devices, the magnetic core of the head is usually incorporated in a metal housing which is connected to ground. Because the core is in a good electrically conductive contact with the housing, the core also has ground potential. However, when that the core does not have ground potential but a certain (small) negative voltage with respect to ground so that a small current can flow from the tape to the head, then it has been found that corrosion processes of the metallic core material may be effectively counteracted. In this case, the magnetic head core should be insulated from the housing.

BRIEF DESCRIPTION OF THE DRAWING

The invention will now be described in greater detail, by way of example, with reference to the accompanying drawing in which.

DESCRIPTION OF THE PREFERRED EMBODIMENT

The relevant electrochemical corrosion of metallic magnetic cores occurs according to the following mechanism.

The head surface comes in contact with an electrolyte (water with chemicals dissolved therein so that the liquid is conductive). The metal parts of the head surface are at an electric potential (dissolving pressure) with respect to the electrolyte.

Said potential may be different in different places of the head surface, for example, because of:
local differences in the metal composition,
the presence of inclusions,
local inpurities,
local interruption of the passivating skin (pitting corrosion), and/or
differences in the composition of the liquid film (notably in the acidity).

As a result of these potential differences, an electric current starts flowing and certain parts of the metal become anodic and other parts become cathodic. In the anodic places the metal, in the electrolyte, goes into solution and is dissipated by the moving tape.

As a result of secondary phenomena such as hydrolysis, further oxidation and the like, salts and hydroxides hydrolyzed from the metal salt solution can deposit the so-called corrosion products.

These may form a layer screening the metal but usually they are removed by the frictional contact with the tape.

Figure 1:
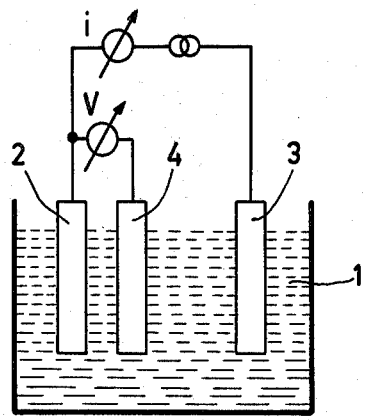
FIG. 1 shows diagrammatically a device for investigating the corrosion behavior of a metallic magnetic core.

The corrosion behavior of a head metal in a certain electrolyte 1, for example, washwater of tape pigment, has been tested by suspending a sample 2 of the metal in the electrolyte 1 and causing a current to flow via a second electrode 3 (platinum) through the transition metal-electrolyte. The potential between metal and electrolyte is measured by means of a reference electrode 4 (calomel) which is placed as close as possible to the head material, see FIG. 1.

Figure 2:
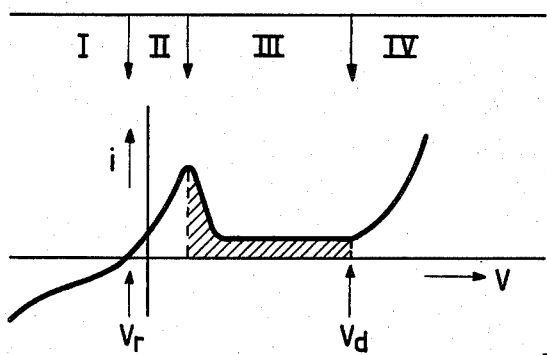
FIG. 2 shows, with reference to a currentvoltage diagram, a characteristic example of the corrosion behavior of a metallic magnetic core measured with the device shown in FIG. 1.

The general picture is shown in FIG. 2 in which the current strength i is plotted on the vertical axis and the voltage V is plotted on the horizontal axis. In area I, the metal is protected cathodically. Area II is the active area in which corrosion occurs. In area III, the metal is passivated by a very thin protective oxide skin. When the magnetic head is used in a recorder, the passivating layer will generally be interrupted by sourcing particles of the tape so that the corrosion can occur. In Area IV, corrosion occurs because the oxide skin is interrupted.

The metal then always goes into solution. The potential which is measured at i=0 is termed the quiescent potential $V_{rest}$. This is also termed the cathodic reference potential. No corrosion occurs when the quiescent potential lies in the shaded area of FIG. 2.

The corrosion behavior of head materials has been tested on the basis of Al-Fe-Si (Sendust) and on the basis of Ni-Fe in dilute washwater of tapes with a pH<7, in particular, a pH from 3 to 5. Quiescent potentials of −519 mV (Sendust) and of −14 mV, −60 mV and −270 mV (respectively, (three different materials on the basis of Ni-Fe) were determined.

From these data and from the diagram of FIG. 2, it appears that, by giving the metallic part (the magnetic core) of a magnetic head used in a recorder a certain negative direct voltage with respect to ground so that a current flows from the tape to the head, the occurrence of corrosion of the tape contact face of the head can be reduced. For each system of head and tape material a curve as shown in FIG. 2 can be determined and, therefrom, the voltage necessary to prevent corrosion can be derived. A negative voltage which is at least equal to the quiescent potential $V_{rest}$ found with reference to the determination always gives good results. A negative voltage of −0.6 V always gives good results for the above-mentioned systems of Sendust or a nickel-iron alloy as head material and magnetic tapes with a pH from 3 to 5. The three different nickel-iron alloys comprise, respectively, in present by weight:

1. 76% Ni; 11% Fe; 3% Mo; 4.5% Cn; 0.5% Mn; 3% Nb; 2% Ti.
2. 80% Ni; 12% Fe; 0.2% Mn; 7.8% Nb.
3. 80% Ni; 20% Fe.

Figure 3:
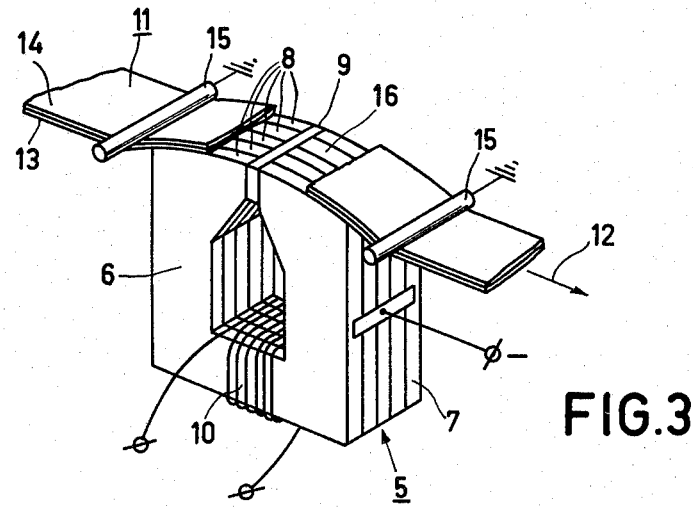
FIG. 3 shows diagrammatically a magnetic tape cooperating with a head in a magnetic recording and playback device according to the invention.

An embodiment of the invention is shown diagrammatically in FIG. 3. This figure shows the device including a magnetic head 5 having a magnetic core consisting of two parts 6 and 7. The individual parts which define a transducing gap 9 are composed of a number of laminations 8 of a metallic magnetic material. An electric winding 10 is provided on the magnetic core. The device further includes means for applying to the core a negative voltage with respect to ground. The magnetic head 5 cooperates with a magnetic tape 11 which is passed over the tape contact face 16 of the head 5 by means of metal tape guide means 15 in the direction of the arrow 12. Magnetic tape 11 is generally of the type having a synthetic resin carrier 13 with a lacquer 14 in which a magnetic pigment is dispersed. An advantage proves to be the reduced amount of adhesion of the magnetic tape 11 to the magnetic head 5. When the tape guides 15 also have a negative voltage with respect to ground, adhesion of the magnetic tape 11 to the tape guides 15 may also be prevented.

What is claimed is:
1. A magnetic recording and playback device, comprising:
   a magnetic head including a metallic core having a tape contact face;
   means for guiding a magnetic tape along the face, and
   means for applying to the core a negative direct voltage with respect to ground potential, whereby corrosion of the core during contact with a magnetic tape is decreased.
2. A device as claimed in claim 1, wherein the negative voltage is at least equal to a quiescent potential determined by the core and a magnetic tape to be guided along the tape contact face, whereby corrosion of the core is substantially eliminated.
3. A device as claimed in claim 2, wherein the quiescent potential is a voltage within a range from −519 mv to −14 mv.
4. A device as claimed in claim 1, wherein the negative direct voltage is at least −0.6 volts.
5. A device as claimed in claim 4, wherein the core consists essentially of Al-Fe-Si.
6. A device as claimed in claim 4, wherein the core consists essentially of a Ni-Fe alloy.
7. A device as claimed in claim 1, wherein the device further comprises means for applying to the tape guide means a negative direct voltage with respect to ground potential, whereby adhesion of a magnetic tape to the guide means is decreased.
8. A magnetic recording and playback device, comprising:
   a magnetic head including a metallic core having a tape contact face;
   means for guiding a magnetic tape along the face, and
   means for applying to the core a negative direct voltage with respect to a magnetic tape guided along the contact face, whereby corrosion of the core is decreased.
9. A magnetic recording and playback device, comprising:
   a magnetic head including a plurality of laminations consisting essentially of Al-Fe-Si, the laminations being stacked to form a magnetic head core having a tape contact face;
   means for guiding a magnetic tape along the face, and
   means for applying to the core a negative direct voltage at least equal to −0.6 v with respect to ground, whereby corrosion of the core during contact with a magnetic tape is substantially eliminated.

* * * * *

UNITED STATES PATENT AND TRADEMARK OFFICE
CERTIFICATE OF CORRECTION

PATENT NO. : 4,467,382

DATED : August 21, 1984

INVENTOR(S) : HENDRIKUS F. HUISMAN

It is certified that error appears in the above-identified patent and that said Letters Patent is hereby corrected as shown below:

Col. 1, line 34, change "physicalchemical" to --physical-chemical--;

line 35, after "It" change "has been" to --was--;

line 57, delete the heading "PRIOR ART";

line 59, after "In" insert --prior art--;

line 62, after "contact" insert --relationship--;

line 64, after "when" delete "that";

Col. 2, line 7, after "drawing" insert --,--;

line 11, change "currentvoltage" to --current-voltage--;

line 41, after "places" insert --,-- ;

line 45, change "deposit" to --deposit (--;

line 46, after "products" insert --)-- ;

line 58, change "material," to --material;-- ;

UNITED STATES PATENT AND TRADEMARK OFFICE
CERTIFICATE OF CORRECTION

PATENT NO. : 4,467,382
DATED : August 21, 1984
INVENTOR(S) : HENDRIKUS F. HUISMAN It is certified that error appears in the above—identified patent and that said Letters Patent is hereby corrected as shown below:

Col. 2, line 68, after "interrupted" insert --at a measured potential $V_d$--;

Col. 3, line 5, after "shaded area" insert --III--;

line 11, before "three" delete "(";

line 30, change "present" to --%--.

Signed and Sealed this

Twenty-first Day of May 1985

[SEAL]

Attest:

DONALD J. QUIGG

Attesting Officer      Acting Commissioner of Patents and Trademarks